May 7, 1940.  P. SORDOILLET  2,199,763

NAVIGATION APPARATUS

Filed May 27, 1938  2 Sheets—Sheet 1

Inventor

Pierre Sordoillet,

By Watson, Cole, Grindle & Watson

Attorney

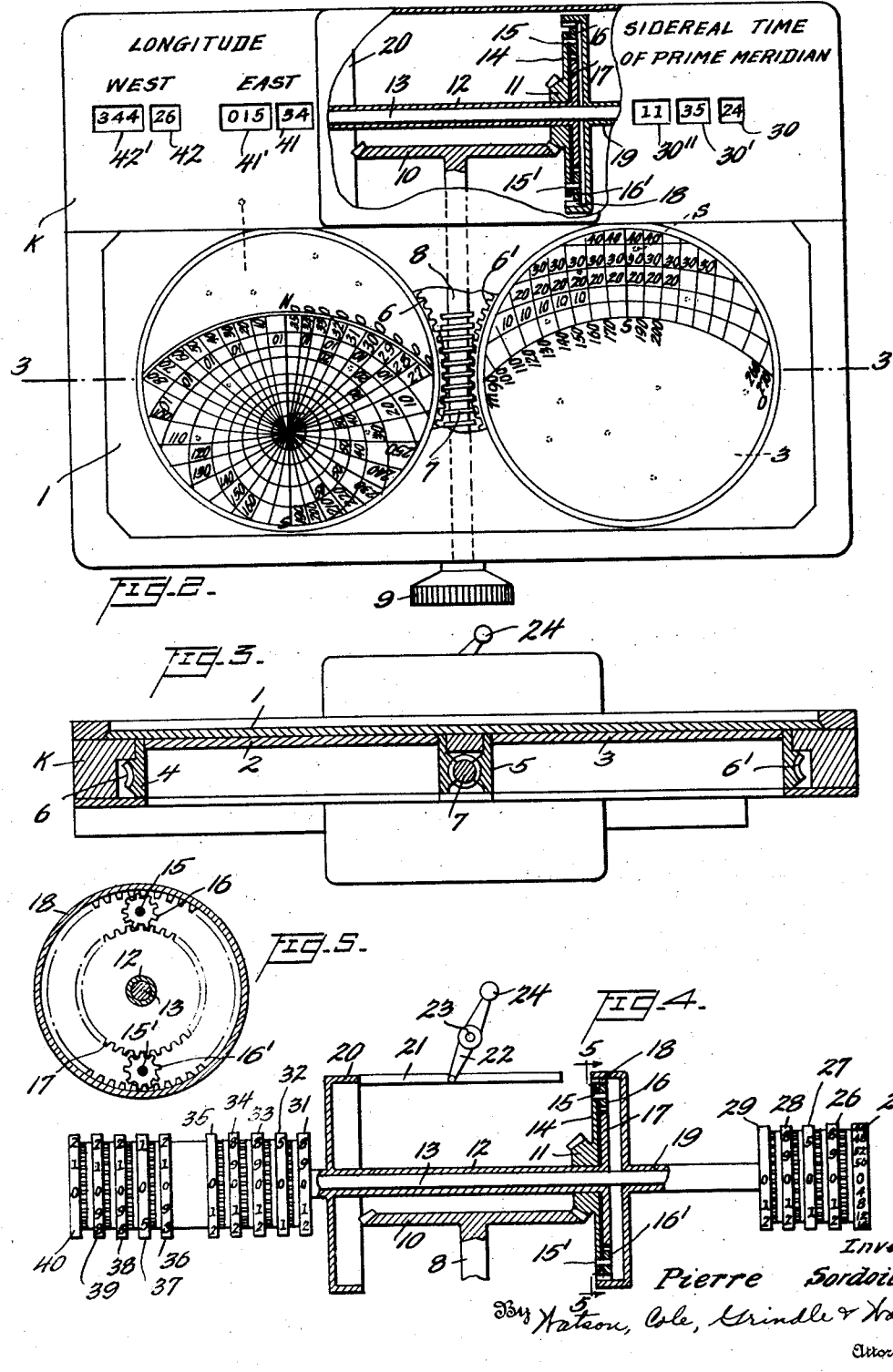

Patented May 7, 1940

2,199,763

UNITED STATES PATENT OFFICE 2,199,763

NAVIGATION APPARATUS

Pierre Sordoillet, Paris, France

Application May 27, 1938, Serial No. 210,508
In France June 21, 1937

9 Claims. (Cl. 33—1)

This invention relates to the art of celestial navigation and more particularly to apparatus and methods for identifying a celestial body and for determining therefrom the observer's position on or above the earth's surface.

According to a standard method of determining the position of a vessel at sea or in the air, the altitude and azimuth of a known celestial body are observed, and the sidereal time of the prime meridian, as shown by the sidereal time chronometer of the vessel, is noted. The navigator then, by dead reckoning, calculates the estimated altitude of the celestial body observed and, by a standard method (for example by the method of St. Hilaire) a line of position, or Sumner line, is determined. The vessel is then known to be at some point on this line of position, and if a second line of position is established by means of a second observation made on a different celestial body, or a subsequent observation on the same celestial body, from a different position, as after the vessel has travelled a certain distance from the point where the first observation was taken, the intersection of the two lines of position, after correction for the travel of the vessel between the times of the two observations, indicates the position of the vessel at the time of said second observation.

In order to establish a line of position it is necessary first to identify the celestial body observed, and second, to calculate the estimated altitude of such body at the instant of observation, the estimated altitude being the altitude at which the body would have been observed if the vessel had actually been at the position estimated by dead reckoning. Various devices have heretofore been employed to assist the identification of an observed celestial body. One such device is described in United States Patent No. 1,401,446, granted to Gilbert T. Rude, and comprises a projection or diagram of the sky and a plurality of projections of the local sphere, or earth, prepared for different latitudes, the latter projections being inscribed on transparent sheets. By selecting the terrestrial projection suitable for the observer's estimated latitude, and orienting it with respect to the celestial projection in the manner described in said patent, it is possible to identify any observed celestial body which is inscribed on the celestial projection. However, this and similar devices, while of assistance in identifying celestial bodies, are of no use in connection with the subsequent operations necessary to determine the position of the vessel.

It is an object of the present invention to provide an apparatus which is adapted not only to enable the navigator to readily identify an observed celestial body, but also to read directly its estimated altitude, thereby enabling him, without any calculation except that of his dead reckoning position or estimated latitude, to determine a line of position.

Another object of the present invention is the provision of a method for determining a line of position without the use of any calculation except that of the dead reckoning position.

A further object of the present invention is the provision of an apparatus of the type mentioned in which the necessary stereographic projections are made on a very fine scale, by photographic reproduction or otherwise, so as to be of a size permitting their convenient manipulation, together with optical means by which the estimated altitude of an observed celestial body may be easily and accurately determined from such projections.

A further object is the provision of an apparatus of the type mentioned, including a microscope having a scale arranged in the focal plane of the eyepiece, whereby said scale may be intercalated between adjacent altitude circles of the terrestrial projection, whereby the estimated altitude of an observed celestial body may be directly read in degrees and minutes.

Another object is the provision of an apparatus of the type mentioned, in which the necessary manipulation of the stereographic projections is effected mechanically, the extent of such manipulation being simultaneously registered by means of registering devices of the odometer type, so that the possibility of error is substantially eliminated.

Other and further objects, features and advantages of the present invention will be apparent to those skilled in the art upon a consideration of the following specification and accompanying drawings, in which Figure 1 is a diagram illustrating the manner of making the stereographic projections employed in accordance with the present invention;

Figure 2 is a plan view of an apparatus constructed in accordance with the present invention, a portion of the casing being broken away to reveal the operating mechanism within;

Figure 3 is a vertical section on line 3—3 of Figure 2;

Figure 4 is a diagrammatic view illustrating the registering mechanism comprised in the apparatus of Figure 2;

Figure 5 is a fragmentary vertical section on line 5—5 of Figure 4; and

Figure 1:
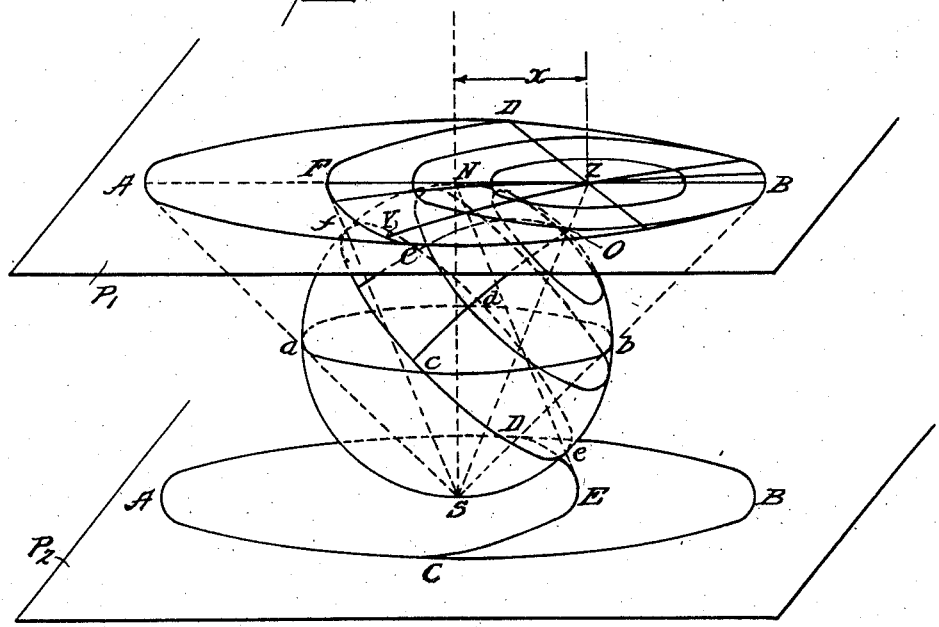
Figure 6:
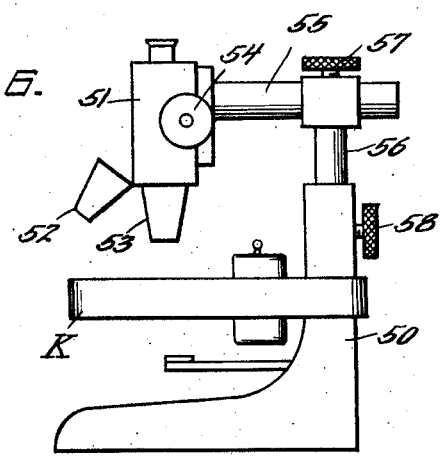
Figure 6 is an elevation of the apparatus of Figure 2 in combination with a microscope of the type hereinafter described.

In accordance with the method of the present invention a stereographic projection of the celestial sphere and a stereographic projection of the terrestrial sphere are superposed, and are then adjusted relatively as a function of the sidereal time of the prime meridian and of the estimated longitude of the navigator's position, which enables identification of an observed heavenly body by means of coordinates inscribed on the terrestrial projection. At the same time, by means to be described, the estimated altitude of the observed body may be accurately read, and the line of position of the vessel determined without further calculation.

The position of bodies in the celestial sphere (referring particularly to those which are commonly used in navigating, and are hereinafter referred to as "navigating stars") is usually defined by means of their horary coordinates, or right ascension and declination. The right ascension is the angle comprised between the semi-major circle or celestial meridian passing through the first point of Aries and that on which the body or star is located. The declination of a star is the distance from the star to the celestial equator measured on the circle of declination, that is, the great circle which passes through the star and through the poles of the celestial sphere.

The variation of the right ascension and declination of the navigating stars with time depends upon several factors, among which the precession is by far the most important. The precession is the movement by which the axis of the earth slowly describes a cone.

The annular variation of the right ascension and the declination is in accordance with the formulas $$\Delta RA = m - n \sin RA \tan d,$$

and $$\Delta d = n \cos RA,$$

in which the value of $n$ is approximately 20" and the value of $m$ is approximately 46". It will be seen therefore, that these coordinates do not vary by more than one minute in the course of a year. Thus, one and the same projection of the celestial sphere can serve for at least a year, and even several years, if the navigating stars which are inscribed thereon are judiciously chosen. Such stereographic projections of the celestial sphere are well known, and need not be further described. In accordance with the present invention, two such projections are employed, one for the northern hemisphere and one for the southern hemisphere.

The present invention employs a plurality of stereographic projections of the earth's surface, made according to different latitudes, such projections being taken on a plane parallel to that of the Equator. Each such projection will consist of a series of arcs designating azimuths and a series of circles or arcs designating altitudes, such projections being the same for all points on a given latitude, regardless of longitude. In accordance with the present invention, the projections of the celestial and terrestrial spheres are superposed and relatively rotated as a function of the sidereal time of the prime meridian and the estimated longitude of the navigator's position, the rotation being effected about a point common to the projections and corresponding to the axis of the poles. The extent of rotation corresponds to the algebraic sum of the sidereal time of the first meridian and the estimated longitude of the place. This relative rotation of the two projections represents or compensates for the navigator's displacement in longitude from the prime meridian and for the earth's rotation in respect to the stars, or in other words, the sidereal time of the prime meridian. With the two projections thus oriented relative to each other, the local coordinates (altitude and azimuth) of an observed body can be directly read from the terrestrial projection. Conversely, if an unknown star has been observed at a given altitude, and in a given azimuth at a particular moment of time, by orienting the two projections in the manner indicated, the observed body can be easily identified by means of the coordinates inscribed on the terrestrial projection.

The terrestrial projection for any given latitude is divided into two portions representing, respectively, that portion of the local hemisphere above the Equator and that portion falling below the Equator. The local hemisphere is defined, for present purposes, as that portion of the earth's surface lying on the observer's side of a great circle lying in a plane parallel to that of the observer's horizon, in other words, the local hemisphere may be defined as that hemisphere of which the observer is the pole.

Figure 1 illustrates the manner in which the terrestrial projections, as employed in the present invention, are made. The condition illustrated assumes a local hemisphere of which the pole, or position of the observer, is at point O on the terrestrial sphere NOS, the letters N and S representing the north and south poles. For projecting on the plane P₁, which is parallel to the equator of the sphere NOS, those points lying above the equator, the center of projection is the south pole S. The line A—B represents, thus, a projection of the observer's meridian, and the circle ABCD a projection of the equator abcd. The point Z is a projection of the observer's position or pole O of the local hemisphere, while the arc CFD is a projection of the portion cfd of the observer's equator cfde lying above the earth's Equator abcd. The azimuth line YZ of plate P₁, for example, represents a projection of the arc cO of the sphere, and so on.

Referring to plate P₂, for which the center of projection is the north pole N, the circle ABCD is a projection of the equator abcd, while the arc CED represents the arc ced of the observer's equator. The area between CED and CBD therefore represents that portion of the local hemisphere lying below the earth's equator.

To inscribe the azimuth arcs and altitude arcs and circles on the plates P₁ and P, the following methods are employed: The altitudes are represented by circles or arcs having their centers on the line A—B representing the local meridian, the distance $x$ from the center of projection N to the center of a given altitude circle or arc being given by the formula:

$$x = \frac{\cotan \frac{h+L}{2} + \tan \frac{h-L}{2}}{2}$$

wherein $h$=altitude and $L$=latitude of the place.

The radius R of a given altitude circle or arc is given by the formula:

$$R = \frac{\cotan \frac{h+L}{2} - \tan \frac{h-L}{2}}{2}$$

the radius of the projected equator being regarded as unity.

The radius of a given azimuth arc is determined by the formula:

$$R = \frac{1}{\cos L \sin Z}$$

in which L=latitude of the place and Z=azimuth.

The appearance of a pair of stereographic projections of a local hemisphere, constructed as just described, is illustrated in Figure 2.

Projections constructed as described may be employed in the method as described and claimed herein, regardless of the apparatus with which they may be used, but a particularly suitable apparatus for this purpose is illustrated in Figures 2–6, and will now be described.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 2 and 3, the apparatus comprises a suitable casing K in which is mounted a transparent plate 1 on which is inscribed a stereographic projection of the local hemisphere, the northern portion being shown on the left and the southern portion on the right. A second transparent plate 2 carries a stereographic projection of the northern celestial hemisphere, and is mounted in a ring 4 suitably journalled in the casing K immediately below the left hand portion of the plate 1. Another transparent plate 3 carries a stereographic projection of the southern celestial hemisphere, and is mounted in a ring 5 which is likewise journalled in the casing K immediately below the right hand portion of the plate 1. The rings 4 and 5 are provided with peripheral teeth 6, 6' meshing with the threaded portion 7 of a shaft 8 journalled in the casing K and extending rearwardly between the rings 4 and 5. The outer end of the shaft 8 is fitted with a knurled button 9, while its inner end is provided with a bevel gear 10, secured thereon or formed integrally therewith. The bevel gear 10 meshes with a bevel pinion 11 which is free to turn upon a sleeve 12, the latter being in turn journalled upon a transverse fixed shaft 13. The bevel pinion 11 is provided with a peripheral flange 14 carrying oppositely disposed stub shafts 15, 15' on which are journalled planetary gears 16, 16'. Each of the latter meshes with a sun gear 17, integral with the sleeve 12, and an orbit gear 18 secured upon or integral with a sleeve 19 which is journalled on the shaft 13.

A brake element 20, corresponding in diameter and general configuration to the orbit gear 18, is secured upon or formed integrally with the sleeve 12. A brake shoe 21 is supported between the brake element 20 and the orbit gear 18, for alternative engagement therewith, by a lever 22 pivoted as at 23 and provided with a handle portion 24. It will be obvious that by moving the brake shoe 21 into the position illustrated in Figure 4, that is, into engagement with the brake element 20, the sleeve 12 is locked while the sleeve 19 is free to rotate in accordance with the movements of the shaft 8 and associated mechanism. Alternatively, by moving the brake shoe 21 in the opposite direction, into engagement with the orbit gear 18, the sleeve 19 will be held against rotation while the sleeve 12 will be free to turn in accordance with the movements of the shaft 8.

A drum 25 is secured upon or formed integrally with the sleeve 19 and carries a series of numerals representing seconds of time, preferably at intervals of four seconds, as for example, 0, 4, 8, etc., up to 56. A second drum 26 is journalled on the sleeve 19 adjacent the drum 25 and is provided with numerals from 0 to 9, inclusive, indicating units of minutes of time. The drum 26 is adapted to be driven from the drum 25 at $\frac{1}{10}$ the speed of the latter, the arrangement of interengaging elements by which this result is accomplished being well known. A drum 27, adapted to be driven from the drum 26, carries numerals from 0 to 5, inclusive, indicating tens of minutes, and is arranged to be driven at $\frac{1}{6}$ of the speed of the drum 26. In a similar manner, drums 28 and 29 are marked and arranged to indicate units of hours and tens of hours of time, the figures on the several drums being visible through appropriate windows 30, 30', 30'' in the casing K (Fig. 2). The registering device just described is adapted to register the sidereal time of the prime meridian, as indicated by an appropriate legend inscribed on the casing adjacent the windows 30, etc.

Similarly, the sleeve 12 is provided with a group of drums 31 to 35, inclusive, adapted to register degrees and minutes of east longitude, and a similar group of drums 36 to 40, inclusive, adapted to register west longitude in degrees and minutes, such drums being visible through the windows 41, 41' and 42, 42', respectively. The numerals on the two groups of drums are arranged so that as the figures indicated by one group of drums increase in value, those indicated by the other group decrease correspondingly, both groups being adapted to register zero simultaneously.

It will be apparent that by reason of the described mechanism, the transparent plates 2 and 3, carrying the projections of the northern and southern celestial hemispheres, may be rotated with respect to the plate 1, which carries a stereographic projection of the local hemisphere corresponding to the navigator's estimated position, by turning the button 9, while at the same time the desired registering device is actuated through the planetary gearing, to register the sidereal time of the prime meridian, or alternatively the longitude (east or west as the case may be) corresponding to the rotation of the plates 2 and 3. In order to avoid play or back lash, the rings 4 and 5 are preferably biased towards zero or starting position by suitable resilient means, not shown.

In using the apparatus, the navigator concentrates his attention upon the plate 2 and the left hand portion of the plate 1 if the observed star is in the northern hemisphere, and upon the plate 3 and the right hand portion of plate 1 if the star is in the southern hemisphere. The apparatus is intended to be employed in the following manner.

Let it be assumed, for example, that the position of the vessel, as estimated by the navigator, is latitude 45° 30'' north and longitude 15° 34'' east, and that at 11 hours 35 minutes 24 seconds o'clock on his sidereal time clock the navigator has observed a star of the first magnitude at 35° altitude and azimuth 185°. He wishes to determine the value of $H_e \sim H_o$ (the difference between the estimated altitude and the observed altitude of the particular star observed), which will enable him to enter on his chart the line of position or Sumner line. Assuming that the plate 1, which is of course interchangeable with other similar plates, carries the appropriate projection for the estimated position, the navigator moves the handle 24 so as to bring the brake shoe 21 into engagement with the brake element 20, thus locking the sleeve 12, and then turns the button 9 until the figures appearing in the windows 30, 30', 30'' indicate 11 hours, 35 minutes, 24 seconds of sidereal time. The position of the brake shoe 21 is then reversed, locking the sleeve 19, and the button 9 turned in the opposite direction until the figures 15° 34'' appear in the windows labelled "east longitude". It will be seen that the rings 4 and 5, carrying the plates 2 and 3, have thus been rotated in accordance with the algebraic sum of the sidereal time of the prime meridian and the estimated longitude of the place, east longitude being regarded as minus and west longitude as plus. When this operation has been completed, the coordinates inscribed on the transparent plate 1 will indicate the star which has been observed, and which is identified by its name inscribed on plate 3. Thus, in the example which has just been described, the star S, inscribed on plate 3, will be located approximately at altitude 35° and azimuth 185° as inscribed on plate 1. The navigator is thus able to identify the observed star. It then only remains for him to ascertain the exact estimated altitude ($H_e$) of the star S in order to be able to fix his line of position.

In order to enable the reading of degrees and minutes from the plate 1 with sufficient accuracy, the apparatus thus far described is preferably associated in a fixed position with a microscope now to be described. Thus, in Figure 6, the apparatus described above, and indicated at K, is secured fixedly upon the standard 50 supporting a microscope 51. The latter is provided with two lenses 52 and 53, one having a magnification of about ten diameters, permitting reading directly the position of a star S, in degrees, on the system of lines carried by the plate 1. In the example given, the altitude $H_e$ lies between 35° and 36°. The microscope being centered on the star S, the navigator changes the lens to pass to a magnification of between 50 and 100 diameters. He then completes regulation of the magnification with the aid of an adjusting knob 54 so that a minute scale, arranged in the eyepiece and comprising 60 divisions, is exactly intercalated between the altitude circles 35° and 36°. He is then enabled to read directly the estimated altitude of the star S in degrees and minutes.

The microscope 51 is supported by an arm 55 which is slidably mounted in a post 56, the latter in turn being slidably mounted in the standard 50, the slides 55 and 56 being secured, after adjustment, by means of set screws 57 and 58 respectively. The microscope 51 can thus, in a well known manner, be centered over any portion of the plate 1.

By reason of the provision of a microscope of the nature described, it is possible to employ projections which are greatly reduced in size, so as to be suitable for employment in an apparatus according to the present invention. The advantage of this feature will be obvious when it is considered that in order to be easily read by the naked eye, the minute divisions of such a projection should be spaced at least a millimeter apart, which would require a projection exceeding seven meters in diameter.

Having thus described the invention, what is claimed as new and desired to be secured by Letters Patent is:

1. Navigating apparatus comprising a member having a stereographic projection of the sky inscribed thereon, a second member having a stereographic projection of the local hemisphere inscribed thereon, including a system of altitude and azimuth coordinates, said members being superposed and one of said members being mounted for rotation about a point common to said projections and corresponding to the axis of the poles, said upper member being of transparent material, and means for effecting rotation of said rotatable member in accordance with the algebraic sum of the sidereal time of the prime meridian and the estimated longitude of the observer, said last means comprising a manually rotatable shaft, gearing connecting said shaft and said rotatable member, means for registering the extent of rotation of said rotatable member, and gearing connecting said shaft and said registering means.

2. Navigating apparatus comprising a fixed member carrying a stereographic projection of the local hemisphere, including azimuth and altitude coordinates, a rotatable member carrying a stereographic projection of the sky, said members being superposed, means for rotating said second member about a point common to said projections and corresponding to the axis of the poles, and means for simultaneously registering the extent of rotation in terms of the sidereal time of the prime meridian and the estimated longitude of the observer.

3. Navigating apparatus comprising a fixed member carrying a stereographic projection of the local hemisphere, including azimuth and altitude coordinates, a rotatable member carrying a stereographic projection of the sky, said members being superposed, means for rotating said second member about a point common to said projections and corresponding to the axis of the poles, and means for simultaneously registering the extent of rotation in terms of the sidereal time of the prime meridian and the estimated longitude of the observer, said last means comprising registering devices of the odometer type having suitable figures inscribed thereon and operatively connected to said rotatable member.

4. Navigating apparatus comprising a fixed member carrying a stereographic projection of the local hemisphere including azimuth and altitude coordinates, the portions of said hemisphere lying above and below the equator, respectively, being separately depicted, a pair of rotatable members carrying, respectively, stereographic projections of the northern celestial hemisphere and the southern celestial hemisphere, said rotatable members being supported for rotation about the poles of their respective projections, said poles being in register with the corresponding poles of said projection carried by said fixed member, means for simultaneously rotating said rotatable members, and means for registering the extent of said rotation in terms of the sidereal time of the prime meridian and the estimated longitude of the observer.

5. Navigating apparatus comprising a fixed member carrying a stereographic projection of the local hemisphere including azimuth and altitude coordinates, the portions of said hemisphere lying above and below the equator, respectively, being separately depicted, a pair of rotatable members carrying, respectively, stereographic projections of the northern celestial hemisphere and the southern celestial hemisphere, said rotatable members being supported for rotation about the poles of their respective projections, said poles being in register with the corresponding poles of said projection carried by said fixed member, means for simultaneously actuating said rotatable members and comprising a manually rotatable shaft operatively connected to said members, and means for simultaneously registering the extent of rotation of said rotatable members, said registering means being operatively connected with said shaft.

6. Apparatus as defined in claim 1, said registering means comprising devices of the odometer type, one of said devices being graduated in hours, minutes and seconds and another of said devices being graduated in degrees and minutes of longitude.

7. Apparatus as defined in claim 1, said registering means comprising devices of the odometer type, one of said devices being graduated in hours, minutes and seconds and another of said devices being graduated in degrees and minutes of longitude, said registering devices being operatively connected to said shaft by means of a selective planetary gear train whereby said devices may be alternatively operated in accordance with the movements of said rotatable member.

8. Apparatus as defined in claim 5, said registering means comprising devices of the odometer type, one of said devices being graduated in hours, minutes and seconds and another of said devices being graduated in degrees and minutes of longitude.

9. Apparatus as defined in claim 5, said registering means comprising devices of the odometer type, one of said devices being graduated in hours, minutes and seconds and another of said devices being graduated in degrees and minutes of longitude, said registering devices being operatively connected to said shaft by means of a selective planetary gear train whereby said devices may be alternatively operated in accordance with the movements of said rotatable member.

PIERRE SORDOILLET.